UNITED STATES PATENT OFFICE.

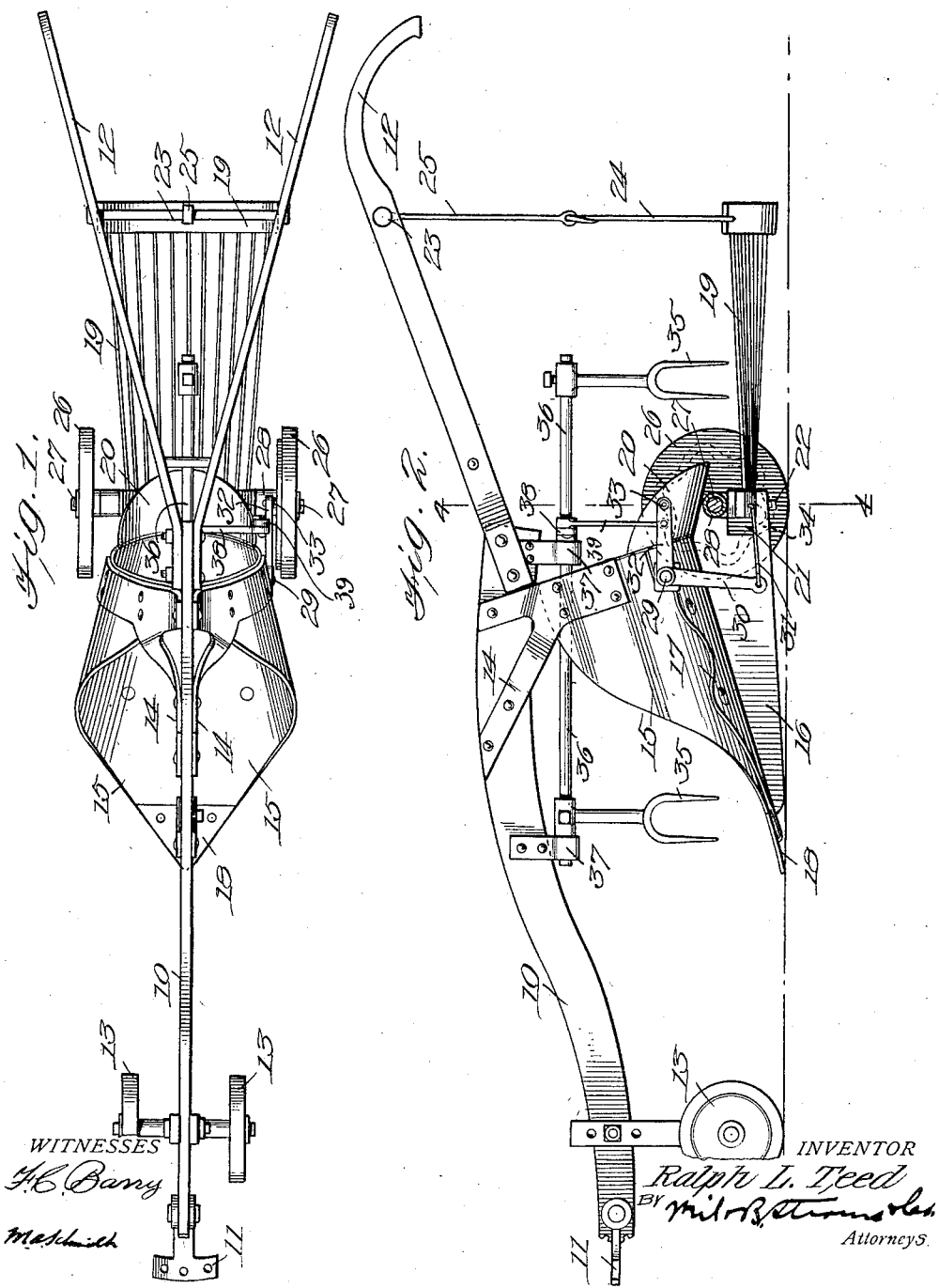

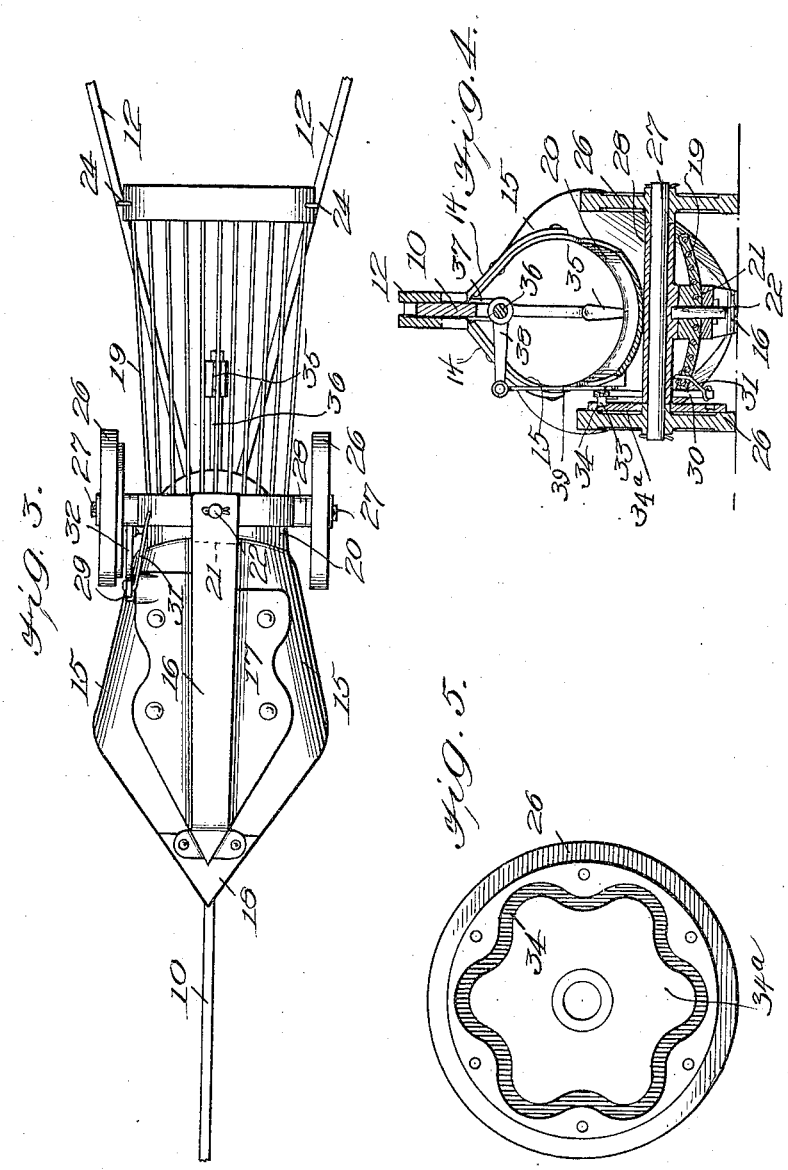

RALPH L. TEED, OF AUGUSTA, MAINE.

POTATO-DIGGER.

1,029,831.  Specification of Letters Patent. Patented June 18, 1912.

Application filed January 15, 1912. Serial No. 671,192.

*To all whom it may concern:*

Be it known that I, RALPH L. TEED, a citizen of the United States, residing at Augusta, in the county of Kennebec and State of Maine, have invented certain new and useful Improvements in Potato-Diggers, of which the following is a specification.

This invention relates to that class of potato diggers characterized by a plow which digs up the potatoes, and a shaking screen mounted behind the plow on which the potatoes drop and the dirt adhering thereto is shaken off.

It is the object of the invention to provide in a machine of the kind stated a novel form of plowshare, and means for supporting and operating the screen, together with a combination and arrangement of parts to be hereinafter described and claimed.

The invention also has for its object to provide improved means for removing the vines and weeds from the potatoes as they travel over the plow and the screen.

In the accompanying drawing, Figure 1 is a plan view of the machine. Fig. 2 is a side elevation thereof. Fig. 3 is a bottom plan view. Fig. 4 is a cross-section on the line 4—4 of Fig. 2. Fig. 5 is an elevation of the cam wheel.

Referring specifically to the drawing, 10 denotes the plow beam, on the front end of which is mounted a clevis 11 for attachment of the draft animals. To the rear end of the plow beam are attached handles 12. The front end of the plow beam also carries gage-wheels 13 to regulate the depth of the plow.

To the sides of the plow beam 10, at the rear end thereof, are bolted, or otherwise rigidly fastened, depending brackets 14 which carry the mold-board of the plow, said mold-board being double and comprising two sheet-steel plates 15 of substantially the same shape as ordinary mold-boards. The two plates come together at their lower edges, and thence curve outward in opposite directions, and upward to the brackets 14 to which they are secured as already stated. The upper ends of the plates curve inward and toward one another, the brackets being correspondingly shaped, and said ends come close together.

Beneath the mold-board herein described is located a shoe or runner 16, having outstanding flanges 17 extending sidewise from the top thereof, to which flanges the mold-board is also bolted. A point 18 is also bolted to the forward end of the shoe at the corresponding end of the mold-board.

A plow constructed as herein described turns in the center, and the potatoes and dirt are lifted and carried rearward over the mold-board to a screen 19 working behind the same. At the rear end of the mold-board is a downwardly inclined apron 20, which terminates a short distance above the forward end of the screen and delivers the potatoes and dirt thereonto.

The rear end of the shoe 16 has a recess 21 into which the forward end of the screen 19 extends, and in which it is pivoted on a pin 22 to swing back and forth transversely of the machine. The rear end of the screen is suspended from a cross-bar 23 carried by the handles 12, the suspension means being a bail 24 connected to the rear end of the screen, and a link 25 which loosely connects the bail to the cross-bar. The screen is curved transversely to prevent the potatoes from dropping off sidewise.

The machine is mounted on wheels 26, both of which are made fast on an axle 27 extending through a bearing 28 carried by the rear end of the shoe 16.

The following means are provided for shaking the screen: To one of the flanges 17 is pivoted, as indicated at 29, a bell-crank lever having one of its branches 30 extending downward and connected by a link 31 to the front end of the screen on one side thereof. The other branch 32 of the bell-crank lever carries a side roller 33 which works in a continuous cam groove 34 made in a plate 34ª carried on the inner face of one of the wheels 26. The cam groove is wavy so that when the wheel is in motion the bell-crank lever will be rocked on its pivot, whereby, through the link 31, the screen is shaken.

The attachment for removing the vines and weeds from the potatoes comprises two oscillatory forks 35 located, respectively, above the screen and the forward portion of the mold-board. The forks are carried by a shaft 36 extending lengthwise of the machine and mounted in bearings 37 on the plow beam. To the shaft 36 is fixed a rocker arm 38 which latter is connected by a link 39 to the branch 32 of the bell-crank lever.

It will be evident from the foregoing that when the bell-crank lever is in motion, the shaft 36 is rocked, whereby the forks 35 are swung back and forth transversely of the machine, thereby throwing the vines and weeds to one or the other side.

I claim:

1. The combination of a plow, a screen mounted behind the same, wheels on which the plow is mounted, a rock shaft mounted above the plow and the screen, and extending lengthwise thereof, forks carried by the rock shaft and operating transversely above the plow and the screen when the rock shaft is operated, and wheel-driven means for operating the rock shaft.

2. The combination of a plow, wheels on which the plow is mounted, one of the wheels having a cam groove, a screen mounted behind the plow, a rock shaft mounted above the plow and the screen, and extending lengthwise thereof, forks carried by the rock shaft and operating transversely above the plow and the screen, an arm fixed to the rock shaft and extending outward therefrom, a bell-crank lever carried by the plow, one of the branches of said lever being connected to the aforesaid arm, and a roller carried by the bell-crank lever, said roller working in the aforesaid cam groove.

In testimony whereof I affix my signature in presence of two witnesses.

RALPH L. TEED.

Witnesses:
CHARLES O. TURNER,
SAMUEL P. COOLIDGE.

Copies of this patent may be obtained for five cents each, by addressing the "Commissioner of Patents, Washington, D. C."